(12) United States Patent
Tschentscher et al.

(10) Patent No.: US 6,718,273 B1
(45) Date of Patent: Apr. 6, 2004

(54) METHODS FOR SIMPLIFIED FIELD-ORIENTED CONTROL OF ASYNCHRONOUS MACHINES

(75) Inventors: Harald Tschentscher, Grossbotwar (DE); Martin Eisenhardt, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 377 days.

(21) Appl. No.: 09/598,556

(22) Filed: Jun. 21, 2000

(30) Foreign Application Priority Data

Jun. 22, 1999 (DE) .......................................... 199 28 481

(51) Int. Cl.$^7$ ............................................. G01R 19/00
(52) U.S. Cl. ........................ 702/64; 702/79; 702/115; 324/177; 324/207.25; 361/23; 361/31; 361/87; 363/37; 363/98
(58) Field of Search ................................. 318/432, 727; 363/41, 98, 37, 84; 361/93, 31, 87, 23; 702/57, 64, 65, 79, 72, 183, 189, 113, 115; 324/177, 207.25

(56) References Cited

U.S. PATENT DOCUMENTS

| 4,442,393 A | | 4/1984 | Abbondanti ................ 318/802 |
| 5,309,349 A | * | 5/1994 | Kwan .......................... 363/98 |
| 5,317,246 A | | 5/1994 | Wei ............................. 318/432 |
| 5,502,360 A | | 3/1996 | Kerman et al. ............. 318/805 |
| 5,969,958 A | * | 10/1999 | Nielsen et al. ................ 363/41 |
| 6,479,971 B1 | * | 11/2002 | Schrodl ....................... 322/32 |

FOREIGN PATENT DOCUMENTS

| DE | 196 08 039 | 9/1997 |
| EP | 0 535 280 | 4/1993 |
| GB | 2194 401 | 3/1988 |
| GB | 2 280 798 | 2/1995 |
| GB | 2 313 215 | 11/1997 |
| WO | WO99/01929 | 1/1999 |

OTHER PUBLICATIONS

Ueda et al., 'Feasibility of Zero Phase Current Detection by Sensing Current at Each of the Three Phases in Power Distribution Networks', Apr. 1995, IEEE, Vol: 10, No:2, pp. 613–620.*

F. Blaschke, "Das Verfahren der Feldorientierung zur Regelung der Asynchronmaschine" [The Field Orientation Method for Controlling an Asynchronous Machine], Siemens Forschungs und Entwicklungsberichten [Siemens research and development reports] 1972, pp. 184 et seq.*.

W. Leonhard, "Control of Electrical Drives," Springer Verlag, pp. 214–222.

* cited by examiner

*Primary Examiner*—Marc S. Hoff
*Assistant Examiner*—Elias Desta
(74) *Attorney, Agent, or Firm*—Kenyon & Kenyon

(57) ABSTRACT

A method for generating manipulated variables for the direct-axis and cross voltage, respectively, to represent the flux-forming current ID and torque-forming current IQ in field-oriented control of asynchronous machines, taking into account the stator voltage drop and steady-state internal voltage. The steady-state internal voltage is calculated on the basis of reference variables of the currents.

3 Claims, 2 Drawing Sheets

METHODS FOR SIMPLIFIED FIELD-ORIENTED CONTROL OF ASYNCHRONOUS MACHINES

FIELD OF THE INVENTION

The present invention relates to methods for simplified field-oriented control of asynchronous machines.

BACKGROUND INFORMATION

Field-oriented control of polyphase (phase-sequence) machines is described, for example, in F. Blaschke, "Das Verfahren der Feldorientierung zur Regelung der Asynchronmaschine" (The field orientation method for controlling an asynchronous machine), Siemens Forschungs- und Entwicklungsberichten (Siemens research and development reports) 1972, pp. 184 ff., or in the textbook "Control of Electrical Drives," W. Leonhard, Springer Verlag, pp. 214–222. In field-oriented control, both the amplitude of the stator flux vector and its position with respect to the rotor flux vector must be monitored at all times. One of the principal tasks in this connection is to decouple the torque-forming currents (cross current IQ) and flux-forming currents (direct-axis current ID) from one another. It is also important to ensure that at every point in time, these currents are at right angles to one another in a rotor-referred coordinate system. This means that the stator currents of the three-phase system must be sensed, transformed into a coordinate system that rotates synchronously with the rotor flux, and compared to the setpoint definitions for the flux-forming component and the torque-forming component of the current. The new current/voltage values are applied to the motor after the calculation, and after transformation back from the rotating reference system to the stationary stator coordinate system. Field-oriented control yields a constant rotation speed even above the nominal speed, improved velocity consistency even under fluctuating output conditions, and high efficiency at full load.

With conventional systems for field-oriented control of asynchronous machines, however, the technical outlay for accomplishing control is relatively high and costly.

One new area of application for field-oriented control systems is, for example, vehicle electrical systems of motor vehicles. Future motor vehicle electrical systems will in some cases have much higher electrical power levels than present-day systems (for example, 4 to 6 kilowatts). This development may be expected, in particular, if accessories that are now mechanically driven are electrified. Such high power levels cannot be achieved with present-day claw-pole generators, since torque transfer via the V-belts becomes critical at these high power levels. Torque peaks at which slippage of the V-belt can occur are particularly critical.

It is advantageous in this context to utilize converter-controlled asynchronous machines.

SUMMARY

It is an object of the present invention to simplify conventional systems for field-oriented control of asynchronous machines.

A first method according to the present invention makes possible a field-oriented control system for asynchronous machines that is much less complex as compared to conventional solutions.

One advantage of using the first method is that separate current sensing can be dispensed with, and thus that the cost of at least two current converters can be eliminated.

As defined in an example development of the first method, in addition to the steady-state internal voltage, the stator voltage drop is also calculated on the basis of reference variables of the torque-forming currents.

As defined in another example development of the first method, the reference cross voltage component $UHQ_{soll}$ of the steady-state internal voltage is calculated using the formula $$UHQ_{soll} = \omega_1 * \Phi,$$

where $\omega_1 = \omega_{mech} + \omega_2$, $\Phi = \int (ISD_{soll} - IMR_{soll}) * R_{Rot} * dt$, and $\omega_2 = ISQ_{soll} / ISD_{soll} / T_{Rot}$ where $\omega_{mech}$ is the angular frequency of the mechanical rotation speed of the three-phase machine, $\omega_2$ the rotor angular frequency, $ISQ_{soll}$ the reference cross current, $ISD_{soll}$ the reference direct-axis current, $T_{Rot}$ the rotor time constant, $\Phi$ the magnetic flux, $IMR_{soll}$ the reference magnetization current, and $R_{Rot}$ the rotor resistance, and the reference direct-axis voltage component $UHD_{soll}$ of the steady-state internal voltage is calculated using the formula $$UHD_{soll} = (ISDL_{soll} - IMR_{soll}) * R_{Rot}.$$

On the basis of these formulae, it is particularly easy to generate the manipulated variables for representing the cross currents and direct-axis currents. It is no longer necessary to sense, the actual currents. A closed-loop control system implemented with conventional methods has thus been transformed, in a manner of speaking, into an open-loop control system that has steady-state properties of similar quality to those of conventional methods. The more accurately the individual machine parameters are known, the better the accuracy of the control system achievable with the first method.

When the first method is used, semiconductor switching with current mirrors may be utilized that independently sense short-circuit currents and thus can protect themselves. This action provides effective protection against any overcurrents that might occur. The current mirrors are advantageously integrated into semiconductor switches.

In a second method according to the present invention, the rotor angular frequency $\omega_2$ of the asynchronous machine is ascertained in a manner in which a temperature influence is automatically taken into consideration. With the second method, the rotor angular frequency of the asynchronous machine can be ascertained very easily.

With a third method according to the present invention, it is possible to accomplish particularly uncomplicated sensing of at least two phase currents of an asynchronous machine. When the third method is used, the values of two phase currents are provided in time-synchronous fashion in a manner substantially improved as compared to conventional methods, as a result of which it is possible to dispense with the provision of two or more A/D converters.

According to an example embodiment of the third method, the first phase current is conveyed to two different A/D channels of a controller, the controller having only one A/D converter. With this feature, it is particularly easy to carry out the third method.

Advantageously, the time interval between the sensing of the value of the first phase current at a first point in time, and the sensing of the value of the second phase current at a second point in time, may be of the same length as the time interval between the sensing of the second phase current at the second point in time and the sensing of the first phase current at the third point in time. Identical time intervals make possible particularly simple calculated analysis of the acquired phase currents.

DETAILED DESCRIPTION

Figure 1:
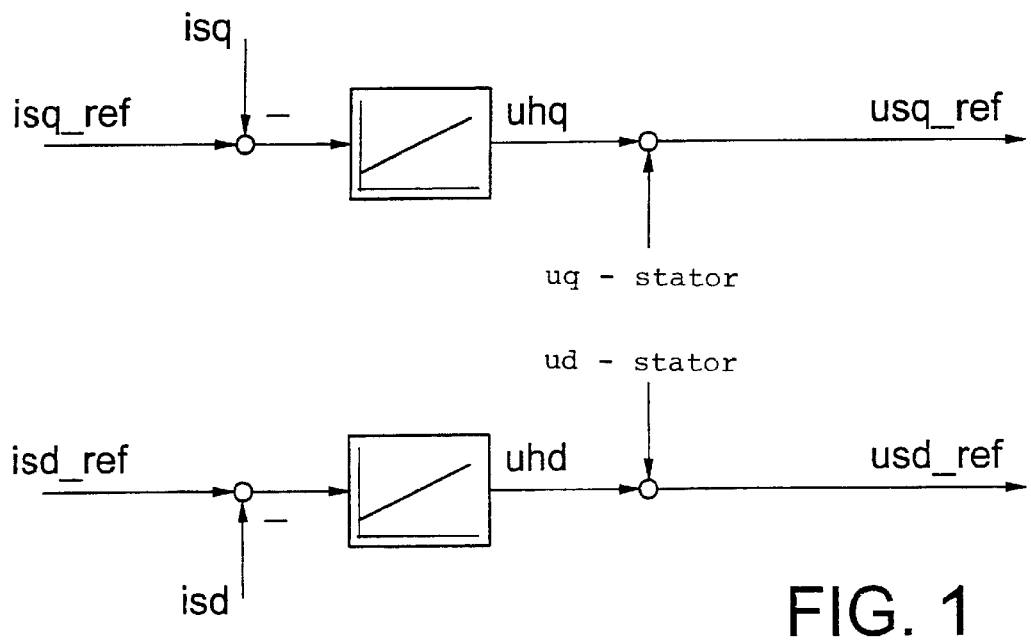
FIG. 1 shows a circuit diagram schematically depicting a conventional method for generating manipulated variables to represent a direct-axis current and a torque-forming current of an asynchronous machine.

A conventional field-oriented control system of an asynchronous machine is first presented with reference to FIG. 1. The essence of a control system of this kind is decoupled control of the flux-forming current (direct-axis current ID) and torque-forming current (cross current IQ). Corresponding current controllers which are not depicted in detail (direct-axis and cross current controllers) have applied to their inputs, as usual, the difference between the reference and actual currents ISQ_ref, ISQ and ISD_ref, ISD. What is created at the output of each of the controllers is a manipulated variable for the direct-axis and cross voltages, respectively, with which the direct-axis current and cross current can be established.

The controllers are usually pilot-controlled with the stator voltage drop UQ_stator, UD_stator, as depicted in FIG. 1. The controllers are then decoupled, and then need only to compensate for the steady-state internal voltage UHQ, UHD.

The magnetic flux necessary for control purposes, and the rotor angular frequency of the asynchronous machine, are obtained with the aid of the so-called flux model, which is known per se and requires no further explanation here. Both the flux model and the stator voltage drop are usually calculated using the actual values for direct-axis current and cross current. Sensing the actual currents requires relatively complex current converters, however, which are to be eliminated according to the present invention.

Figure 2:
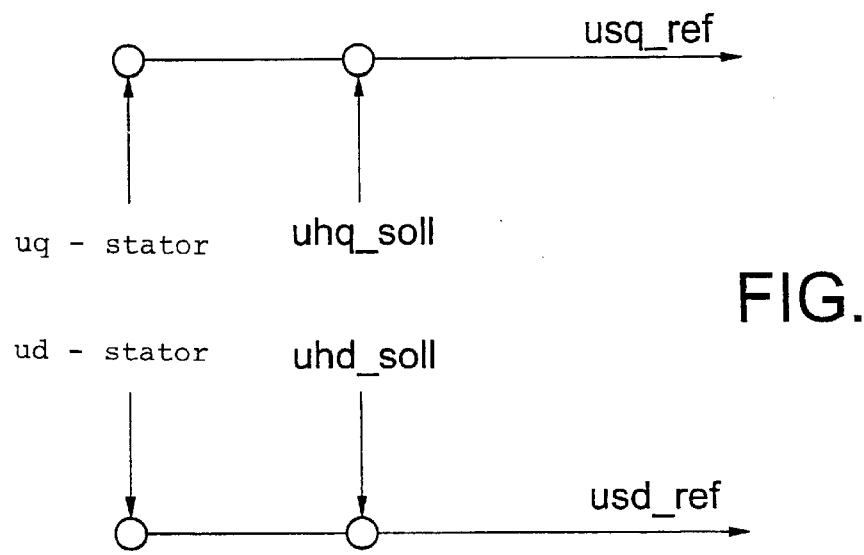
FIG. 2 shows a block diagram for schematic depiction of the first method according to the present invention.

A first method according to the present invention with which uncomplicated field-oriented control of asynchronous machines can be performed, in particular with the elimination of current converters, will now be explained with reference to FIG. 2. In accordance with this first method, the manipulated variables USD_ref and USQ_ref for the direct-axis and cross voltages are calculated exclusively on the basis of reference variables of the currents IQ, ID. It is evident from FIG. 2 that in accordance with the first method, the stator voltage drop UQ_stator, UD_stator is pilot-controlled with the respective components of the steady-state internal voltage, i.e. the reference cross voltage $UHQ_{soll}$, $UHD_{soll}$.

All in all, therefore, the manipulated variables for the direct-axis and cross voltages USD_ref, USQ_ref are generated and can be represented only with reference variables. The calculation methods and formulae with which the components $UHQ_{soll}$ and $UHD_{soll}$ are calculated have already been explained in detail in the summary.

Figure 3:
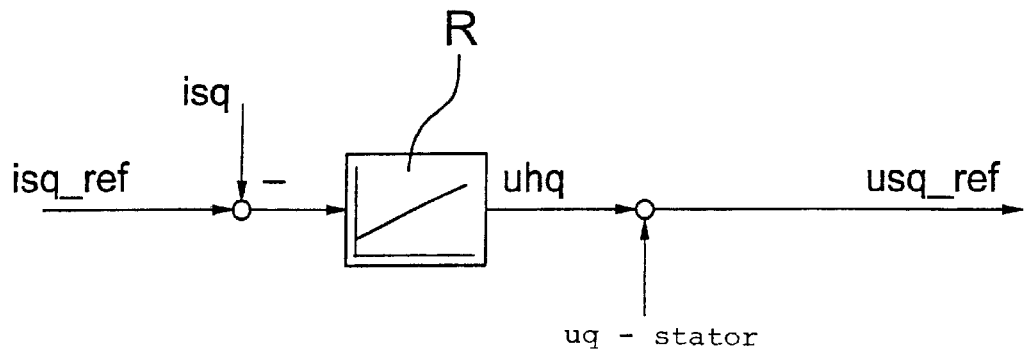
FIG. 3 shows a circuit diagram for schematic depiction of a conventional control system of a cross current controller in a field-oriented control system of an asynchronous machine.
Figure 4:
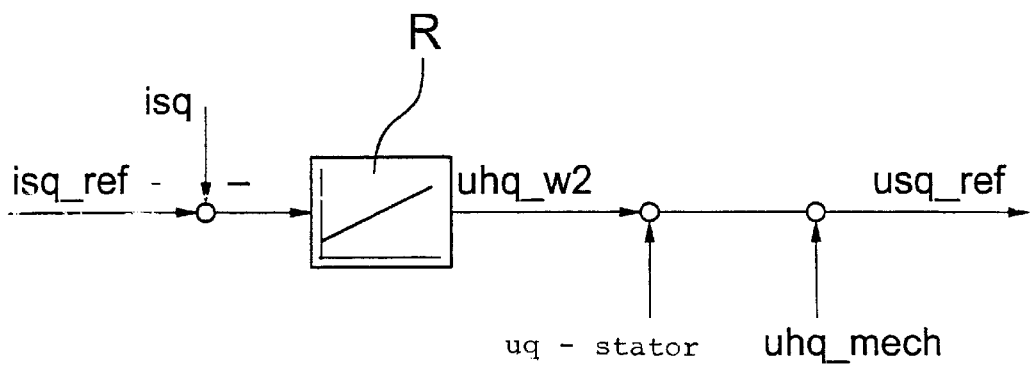
FIG. 4 shows a circuit diagram for schematic depiction of the second method according to the present invention.

A second method according to the present invention will now be explained further with reference to FIGS. 3 and 4.

For decoupled control of the flux-forming current (direct-axis current ID) and torque-forming current (cross current IQ), both the rotor angular frequency $\omega_2$ and the flux of the asynchronous machine are usually ascertained in the flux model already mentioned. $\omega_2$ is defined as:

$\omega_2 = IQ/ID/T_R$, where $T_R$ constitutes the rotor time constant, for which $T_R = L_H/R_{Rot}$ ($L_H$=main inductance; $R_{Rot}$=rotor resistance).

The rotor resistance $R_{Rot}$ is strongly dependent on rotor temperature. It is not possible to measure this temperature in uncomplicated fashion. The stator temperature is comparatively easy to measure, but can deviate greatly from the rotor temperature. In conventional methods, the rotor resistance was ascertained on the basis of the stator temperature, which resulted in comparatively large inaccuracies in terms of rotor angular frequency $\omega_2$.

Using the second method, the influence of temperature of rotor angular frequency $\omega_2$ can be taken into account. Conventionally, a cross current controller R is pilot-controlled with the cross component of the voltage drop at the stator (UQ_stator), as depicted in FIG. 3. What then appears at the output of controller R is the cross component of the steady-state internal voltage, UHQ, which is obtained from the equations $UHQ = \omega_1 \cdot \Phi$, where $\omega_1$ is the stator angular frequency and $\Phi$ the flux of the asynchronous machine ascertained on the basis of the flux model, and $\omega_1 = \omega_{meoh} + \omega_2$, where $\omega_{meoh}$ is the angular frequency of the mechanical rotation speed of the asynchronous machine rotor, and $\omega_2$ is the rotor angular frequency.

In accordance with the second method, the cross current controller R is pilot-controlled with the variable UHQ_MECH=$(\omega_{meoh} \cdot \Phi)$ as well as the stator voltage drop. The variable UHQ_$\omega_2$=$(\omega_2 \cdot \Phi)$ now appears at the output of the controller. The rotor angular frequency $\omega_2$ can now be obtained by simply dividing the flux $\Phi$ into the variable UHQ_$\omega_2$. The temperature influence or temperature dependency is taken into account in this value of $\omega_2$.

A third method according to the present invention makes possible particularly uncomplicated sensing of at least two phase currents of an asynchronous machine. Ideally, for decoupled control of the flux-forming current (direct-axis current ID) and torque-forming current (cross current IQ), at least two phase currents of the asynchronous machine are sensed simultaneously. Based on these phase currents, the actual values of IQ and ID are created by coordinate conversion and transformation into a coordinate system co-rotating with the flux space vector. In a coordinate system of this kind, the variables IQ and ID are then aperiodic variables.

When usual microcontrollers (to be provided at minimum cost) are used for control purposes, however, only one A/D converter is available. In this situation the phase currents can be sensed only sequentially, i.e. with a time offset.

This time offset results, however, in an alternating component in the aperiodic variables IQ, ID converted from the sinusoidal currents. The frequency of the alternating component corresponds to twice the fundamental oscillation frequency. Assuming a constant time offset, the amplitude rises with increasing fundamental oscillation frequency.

This alternating component has a very unfavorable influence on control quality. Current controllers are therefore designed so that they control out the aperiodic variables but at the same time must control out the alternating component. To circumvent this difficulty, it is known to use systems having two parallel A/D converters. These are, however, generally more expensive than systems having only one A/D converter.

The third method allows time-synchronous provision of the values of two phase currents in a substantially improved manner, with no need to provide two A/D converters. Using the third method, it is therefore possible to provide more-economical economical systems as compared to controllers having two A/D converters.

In accordance with the third method, a first phase current and then a second phase current are acquired sequentially, and then the first phase current is acquired again. The arithmetic mean of the two values for the first phase current is then taken. A resulting pairing of the averaged current and of the second acquired current is less erroneous than in the case of conventional sequential methods.

A substantial advantage of the third method is that the time-synchronous values of the necessary phase currents are available to a current controller for field-oriented control of the asynchronous machine, even though only one A/D converter is available.

What is claimed is:

1. A method for sensing and pairing at least two phase currents of an asynchronous machine in order to implement a field-oriented control system, comprising the steps of:

sensing a value of a first phase current at a first time;

sensing a value of a second phase current at a second time a first time interval after the first time;

sensing the value of the first phase current at a third time a second time interval after a second time, wherein the first time interval and the second time interval are the same length;

creating an average of the values of the first phase current at the first time and at third time; and pairing the average with the sensed value of the second phase current.

2. The method according to claim 1, wherein the average is an arithmetic mean.

3. The method according to claim 1, further comprising:

conveying the first phase current to two different A/D channels of a controller which has only one A/D converter.

* * * * *

UNITED STATES PATENT AND TRADEMARK OFFICE
CERTIFICATE OF CORRECTION

PATENT NO. : 6,718,273 B1
DATED : April 6, 2004
INVENTOR(S) : Tschenscher et al.

It is certified that error appears in the above-identified patent and that said Letters Patent is hereby corrected as shown below:

Column 1,
Lines 13-14, change "Asynchro-nmaschine"" to -- Asynchron-maschine" --

Column 2,
Line 23, change "$UHD_{soll}=(ISDL_{soll}-IMR_{soll})*R_{Rot}-$" to
-- $UHD_{soll}=(ISD_{soll}-IMR_{soll})*R_{Rot}-$ --
Line 28, change "sense, the actual currents" to -- sense the actual currents. --

Signed and Sealed this

Third Day of May, 2005

JON W. DUDAS
*Director of the United States Patent and Trademark Office*